Patented July 25, 1939

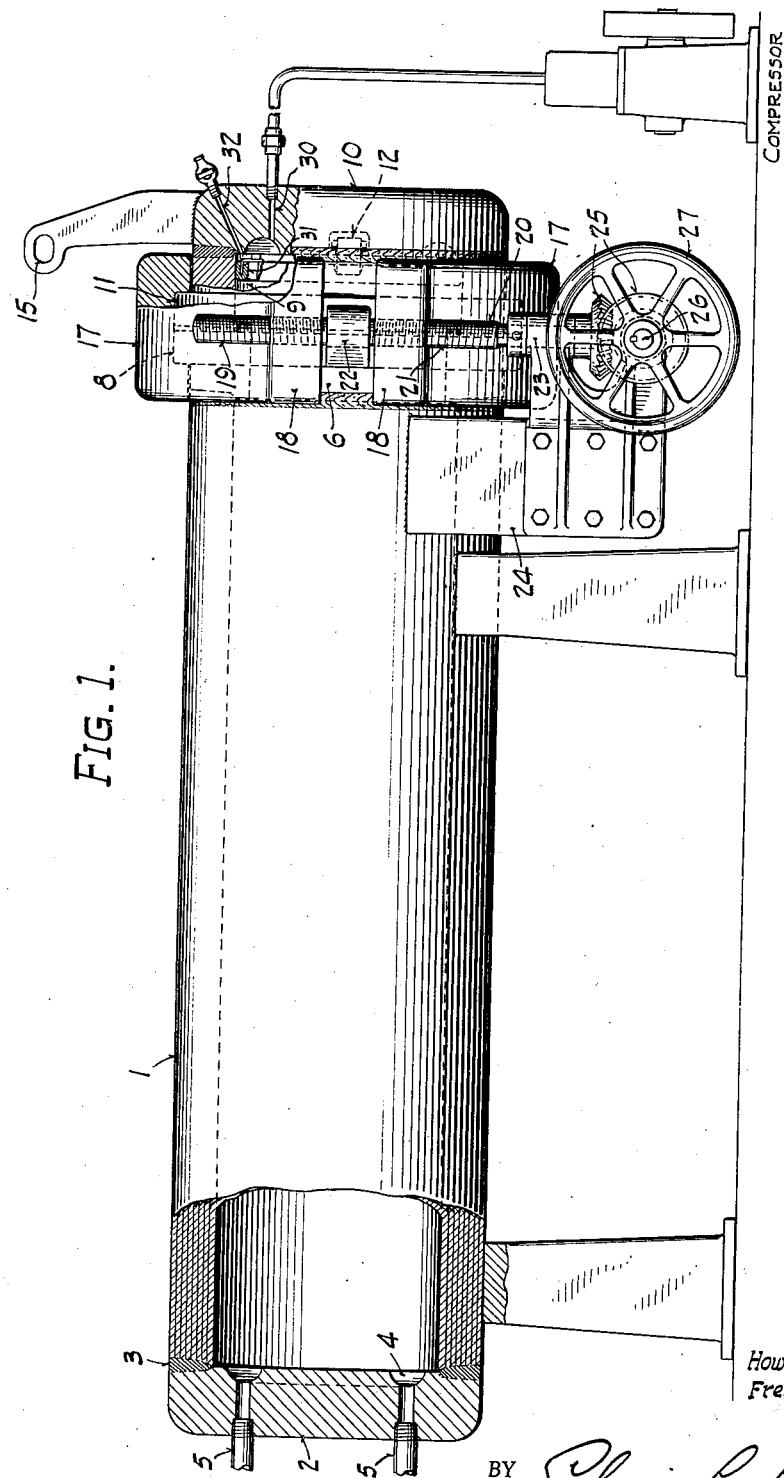

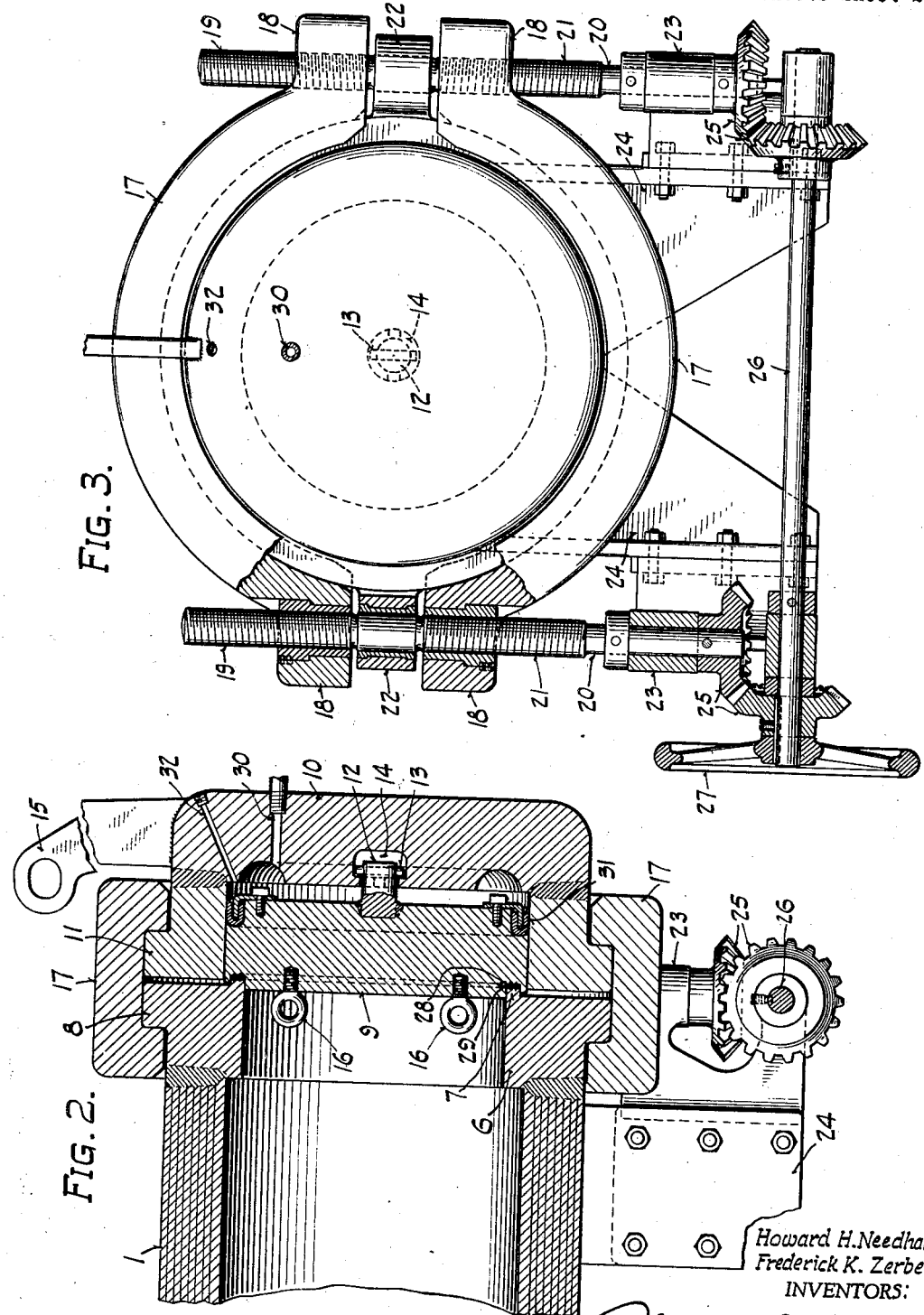

2,166,999

UNITED STATES PATENT OFFICE 2,166,999

QUICK OPENING PRESSURE VESSEL

Howard H. Needham, Wauwatosa, and Frederick K. Zerbe, Milwaukee, Wis., assignors to A. O. Smith Corporation, Milwaukee, Wis., a corporation of New York Application December 24, 1936, Serial No. 117,464

1 Claim. (Cl. 220—24)

This invention relates to a quick opening pressure vessel.

The object of the invention is to provide a pressure vessel of welded construction which can withstand high pressures, and to provide a quick opening closure therefor which will allow quick access to the contents of the vessel immediately upon the release of the pressure.

The invention has been applied in certain chemical industries in which the processes involved require vessels capable of withstanding a pressure of from five to ten thousand pounds per square inch.

The accompanying drawings illustrate the preferred embodiment of the invention although it will be understood that various embodiments may be employed within the scope of the invention. In the drawings:

Figure 1 is a side elevation of the vessel, partly in section;

Fig. 2 is a longitudinal section through one end of the vessel showing the closure; and Fig. 3 is an end elevation partly in section showing the mechanism for operating the closure.

The vessel has a cylindrical shell 1, preferably of laminated construction similar to that set forth in United States Letters Patent No. 1,925,118. One end head 2 of the vessel is formed of plate stock and welded to the end of the shell 1 as by weld metal 3. The head 2 is provided with a circumferential groove 4 on its inner surface adjacent the weld, as set forth in Patent No. 1,921,241. Suitable openings are provided through the head 2 for receiving tube connections 5 for the vessel.

A forged ring 6 is welded to the other end of shell 1 and is provided with a gasket seat 7 at the end near its inner circumference. A flange 8 extends around the outer circumference of the ring 6.

The closure or cover for the vessel is in two parts, an inner head 9 and an outer cover 10. The cover 10 is of cup shape to receive the inner head 9 and has a flange 11 corresponding to flange 8. The inner head 9 is secured to the cover 10 in the manner of a bayonet joint by a central stud 12 which is welded to the head. A pin 13 secures the other end of the stud 12 in a recess 14 on the inner surface of the cover 10. To facilitate handling of the closure, the cover is provided with an eye 15 for engagement with the hook of a crane (not shown). By turning the head 9 relative to the cover 10 when the same is removed from the vessel, the pin 13 may be released from the recess 14, thereby separating the parts. For independently handling the head 9 it is provided with eye bolts 16. In service it is not desired to separate the parts as it is more efficient to handle them as a single unit.

The cover 10 is secured to the end of the vessel by means of the semi-circular clamps 17 which receive the flanges 8 and 11 and hold the same in opposed relation. The clamps 17 are moved toward and away from each other to grip and release the flanges 8 and 11. For this purpose the clamps 17 have projections 18 at each end, the projections on one clamp having threaded connection with the right-hand threads 19 on the respective spindles 20, and the projections on the other clamp having threaded connections with the left-hand threads 21 on the respective spindles 20. The spindles 20 are mounted for rotation in bearings 22 secured to the ring 6 and bearings 23 secured to brackets 24 of the vessel.

The spindles 20 are rotated by means of beveled gears 25, cross shaft 26 and hand wheel 27. Rotation of the spindles 20 in one direction will effect clamping of the flanges 8 and 11, while rotation of the spindles in the opposite direction will effect a quick release of the flanges, thereby permitting removal of the cover 10 and head 9.

For the purpose of sealing the vessel closure it is possible to utilize various embodiments. An efficient construction is to provide a groove 28 on the inner surface of head 9 for receiving a gasket 29 and the seat 7. The head 9 is pressed against the gasket by means of fluid pressure admitted to the space between the head 9 and cover 10 through port 30 in the cover. An extended U-shaped packing ring 31 seals the pressure between the head 9 and cover 10 and allows for relative axial movement between the two. A port 32 is provided through the cover 10 to connect to suitable valve means for exhausting the pressure between the head 9 and cover 10.

We claim:

A pressure vessel comprising a heavy walled shell open at one end and a unitary closure adapted to seal said end, said closure comprising a cover housing an axially movable head attached thereto by a bayonet joint to permit said axial movement of the head in said cover and permit disengagement therefrom, said head having a gasket seat adapted to cooperate with a gasket seat on the open-end of the shell, a gasket interposed between said seats, a chamber between the head and cover in which fluid may be applied, a gasket between said head and cover to prevent the fluid from escaping from said chamber, and means for retaining said cover on said shell.

HOWARD H. NEEDHAM.
FREDERICK K. ZERBE.